Dec. 5, 1961 R. H. HORTON 3,011,313
CONTROLS AND ACCESSORIES SYSTEM
Filed April 7, 1958

INVENTOR.
RICHARD H. HORTON
BY John F. Cullen
ATTORNEY

United States Patent Office 3,011,313
Patented Dec. 5, 1961

3,011,313
CONTROLS AND ACCESSORIES SYSTEM
Richard H. Horton, Cincinnati, Ohio, assignor to General Electric Company, a corporation of New York
Filed Apr. 7, 1958, Ser. No. 726,829
1 Claim. (Cl. 60—39.66)

The present invention relates to a controls and accessories system and, more particularly, to a controls and accessories packaging system for such components as are used with a reaction-type powerplant.

Present-day aircraft reaction-type powerplants utilize controls and accessories systems which are made up of individually designed and constructed components such as fuel and lube pumps, tachometer generators, alternators and generators to name a few. These components are individually and independently mounted on the powerplant and accessory drive gear cases when they are used. The components normally are all over the powerplant and they each have their own casings, shafts, and bearings and are generally interconnected through the use of flexible hoses and fittings. The components seldom have any provision for cooling other than through the use of heat transfer through the lubricating oil in the gear cases to a lubricating oil-fuel oil cooler in many cases and, by ambient air cooling over the component casings. The reaction-type powerplants of today in the very high thrust class of 15,000 pounds and over generally require controls and accessories systems which weigh on the order of 400–800 pounds and above.

For a powerplant which is required to operate at flight speeds above Mach 2, the ambient temperatures are such that practically all of the components of the controls and accessories system must be cooled or otherwise designed to stand these higher temperatures. Further, during recent years, basic engine weights have been decreasing per unit of thrust while controls and accessories weights have remained relatively constant or have increased. Thus, the temperature and weight problem in the use of the controls and accessories components has become more critical.

Some attempts have been made to enclose some of the components by common casing means or the like and duct cooling fluid to the casing to cool the components. However, generally this has merely been an addition of extra weight of the casing without any simplification of the complex control and accessories system. In other words, merely covering the components to provide a convenient means for ducting cooling fluid has only partially solved the problem and has not generally been too saisfactory because of the additional weight required. The instant invention overcomes these defects by providing a novel scheme in which the controls and accessories system is considerably simplified with a significant weight reduction as well as providing a system for operating conventional components in higher ambient temperatures.

It is the primary object of the present invention to provide a controls and accessories system that has a significant weight reduction over the present systems and is constructed for operation in higher ambient temperatures.

A further object is to provide such a system to permit easy servicing by simplification and reduction of the number of parts normally required.

Another object is to provide such a system which lends itself to standardization of the controls and accessories components and has increased reliability because of fewer parts and a reduced number of fluid connections and joints than in conventional systems.

Briefly stated, in accordance with my invention, I provide a system for packaging all or substantially all of the control and accessory components for a reaction-type powerplant within one enclosing casing which provides a structural support for all of the components and is simply supported by the powerplant through a small number of supports. The controls and accessories components are mounted in stacked relation to common shafts that are supported by and within the casing and are driven from a point externally of the casing which driving connection may form a support for the casing from the powerplant. Means may be provided for interconnecting the components where required by internal connecting casing passages and circuits. The connections required for connecting external engine systems may preferably be brought in to one end of the casing and then directed by additional connecting means to the internal components. The grouped or stacked components, all carried within a common casing, are cooled by insulating the casing and directing cooling fluid through the casing which cooling fluid may be liquid fuel. The repair or replacement of any component is completed by unplugging the whole casing and replacing it with a new system, thus lost time for operation is reduced.

While the specification concludes with a claim particularly pointing out and distinctly claiming the subject matter which I regard as my invention, it is believed the invention will be better understood from the following description taken in connection with the accompanying drawing in which:

Figure 1:
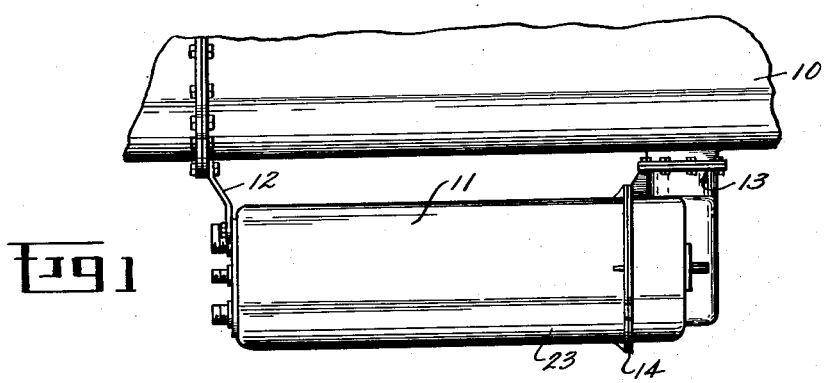
FIGURE 1 is an elevation outline view illustrating the system of the present invention and partially showing the powerplant to which it is attached.
Figure 2:
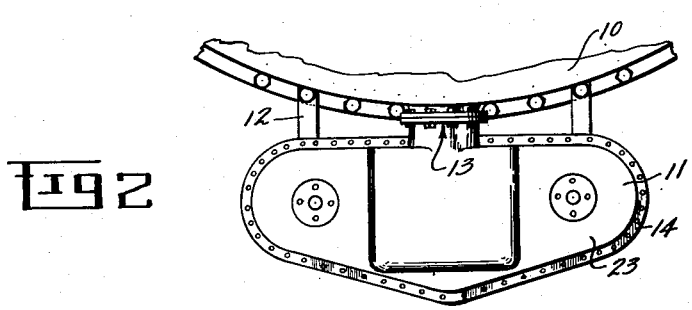
FIGURE 2 is an end view of the structure shown in FIGURE 1.

Referring first to FIGURE 1, there is shown a partial outline of a powerplant 10 which may be a reaction-type powerplant or, for illustrative purposes, a gas turbine or jet engine type powerplant. Such powerplant, as previously stated usually requires many control and accessory elements which are generally hung on the engine at various points and interconnected by piping, flexible hoses, and fittings. The present invention brings all or substantially all of these components together and places them in a supporting casing 11 in a manner to be described. In order to support the control and accessory components, an enclosed casing 11 is preferably carried from the powerplant by suitable means 12 which take any well-known form. In the instant invention, because of the simplicity of the system, the whole control system may be supported by as few as three supports, one of which is generally indicated at 13 and may be the external driving connection. The connection 13 may conveniently be part of the conventional gear case to which the casing 11 may be attached by flange 14.

The casing 11 is intended to support all or substantially all of the control and accessory components of a typical reaction-type powerplant, thus locating them in a convenient single position which utilizes considerably less space than conventional systems and which may be easily serviced by complete replacement.

Figure 3:
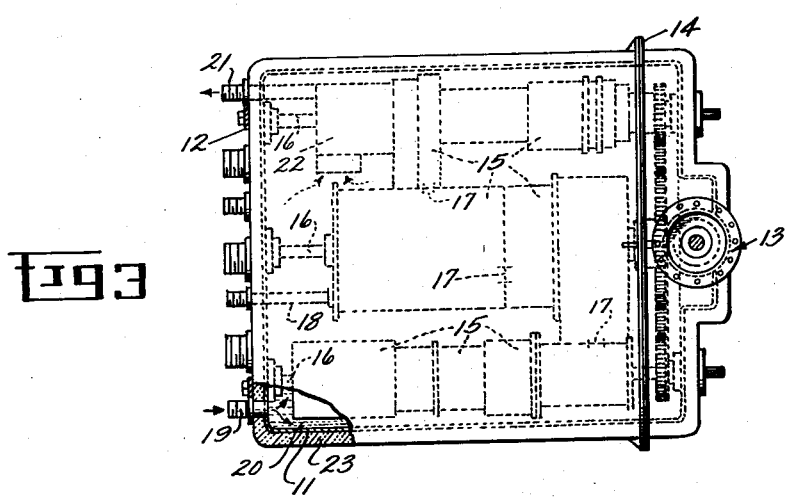
FIGURE 3 is a schematic plan view of the system of the present invention partially broken away and showing the arrangement of the controls and accessories components therein.

The components that are normally required for such a powerplant may be seen schematically in FIGURE 3. As shown therein, the blocks 15 may be termed the components and accessories. These will take any suitable shape and size and they are shown schematically only in FIGURE 3 and are merely illustrative of the arrangement according to the instant invention. As shown, the components are supported within the casing 11 partially by common shafts 16 which, preferably are arranged in parallel relation as shown, and may comprise any suitable number as required, three being shown. The components 15 are supported by the casing on the shaft in stacked relation and in groups on each shaft and preferably in abutting relation as shown. The required fluid or circuit interconnections between various components may be made by suitable aligning openings or passages 17 which, because of the abutting relation, can reduce the need for hoses in fluid connections and consequent extra joints with a lessening of the risk of leakage. The shafts 16 may be interconnected by suitable gearing to a common driving connection 13 as shown, or may extend through the casing as shown for additional driving connections. To maintain the simplicity, and reduce the weight, it is preferred that a common driving connection 13 be utilized to drive all of the internal shafts.

Since it is inevitable that some of the control and accessory components will require additional connection, suitable space is left between the components and the casings to direct additional connecting means or circuits 18 from the components to the outer end of the casing and as shown, preferably to one end of the casing. By making all connections to external points on one end of the unit, the installation is considerably simplified.

In order to provide cooling of the internally supported stacked and abutting components, the internal casing structure is supported to duct a fluid, such as fuel through the casing, so that it completely covers and cools the inside surface of the casing, components, and any heat generating parts before it is directed through an outlet. The inlet 19 may direct fuel through the casing and around the components through space 20 to take up the heat generated by the components after which it may be disposed of through outlet 21. The fluid exiting from 21, if fuel, may be the outlet of a pump as schematically represented by one of the components in FIGURE 3. In other words, if fuel is used, it may enter at 19, pass through the casing for cooling purposes and then be taken in by component 22, which may be a fuel pump, which pumps the fuel through outlet 21 for use in the powerplant.

In addition, the casing 11 may be insulated by blanket 23 to reduce the amount of heat transferred to the cooling fluid from the high ram ambient temperature external to the casing 11. As described, the controls and accessories components are grouped and arranged in the stacked relation in a package to facilitate interconnecting passages. This arrangement also reduces the amount of surface metal to be cooled and is lighter in weight. The components are conventional except as they are modified to utilize the common casing and common shafts.

For a typical installation, the present invention permits a weight reduction of over 50% in the overall controls and accessories required for large size reaction-type powerplant previously mentioned. It can be seen that the system disclosed permits operating conventional components at higher ambient temperatures and simplifies the mounting by supporting the whole control system in a single box from the powerplant, of which part of the support may be the driving connection. It will be apparent that servicing is quite simple in the present invention and much of the external interconnecting hoses and wires are eliminated. The system is compact as compared to conventional systems and thus requires far less space as well as reducing the total number of parts and joints to increase reliability and avoid leakage.

While I have hereinbefore described a preferred form of my invention, obviously many modifications and variations of the present invention are possible in the light of the above teachings. It is therefore to be understood that within the scope of the appended claim, the invention may be practiced otherwise than as specifically described.

What I claim as new and desire to secure by Letters Patent is:

A control and accessory system for a reaction-type powerplant comprising an enclosing insulated casing, means for supporting said casing from said powerplant, a plurality of parallel drive shafts supported by and within said casing, a single drive means interconnecting said shafts and said powerplant for driving the shafts externally of said casing, said drive means forming part of said supporting means, a plurality of interconnected and abutting control and accessory components in stacked relation on said shafts and driven thereby, groups of said components having a common supporting shaft, a coolant inlet and a coolant outlet to duct coolant through said casing to cool said casing and components, and additional connecting means in one end of said casing directed to said control and accessory components.

References Cited in the file of this patent

UNITED STATES PATENTS

| | | |
|---|---|---|
| 2,638,744 | Price | May 19, 1953 |
| 2,696,712 | Lewis | Dec. 14, 1954 |
| 2,717,489 | Hasbrouck | Sept. 13, 1955 |
| 2,783,613 | Von Zborowski | Mar. 5, 1957 |
| 2,803,943 | Rainbow | Aug. 27, 1957 |

FOREIGN PATENTS

| | | |
|---|---|---|
| 489,052 | Canada | Dec. 23, 1952 |
| 597,656 | France | Sept. 7, 1925 |